May 29, 1956 T. R. PRITCHARD 2,747,775
MEASURING VALVE CLOSURE
Filed April 29, 1953 3 Sheets-Sheet 1
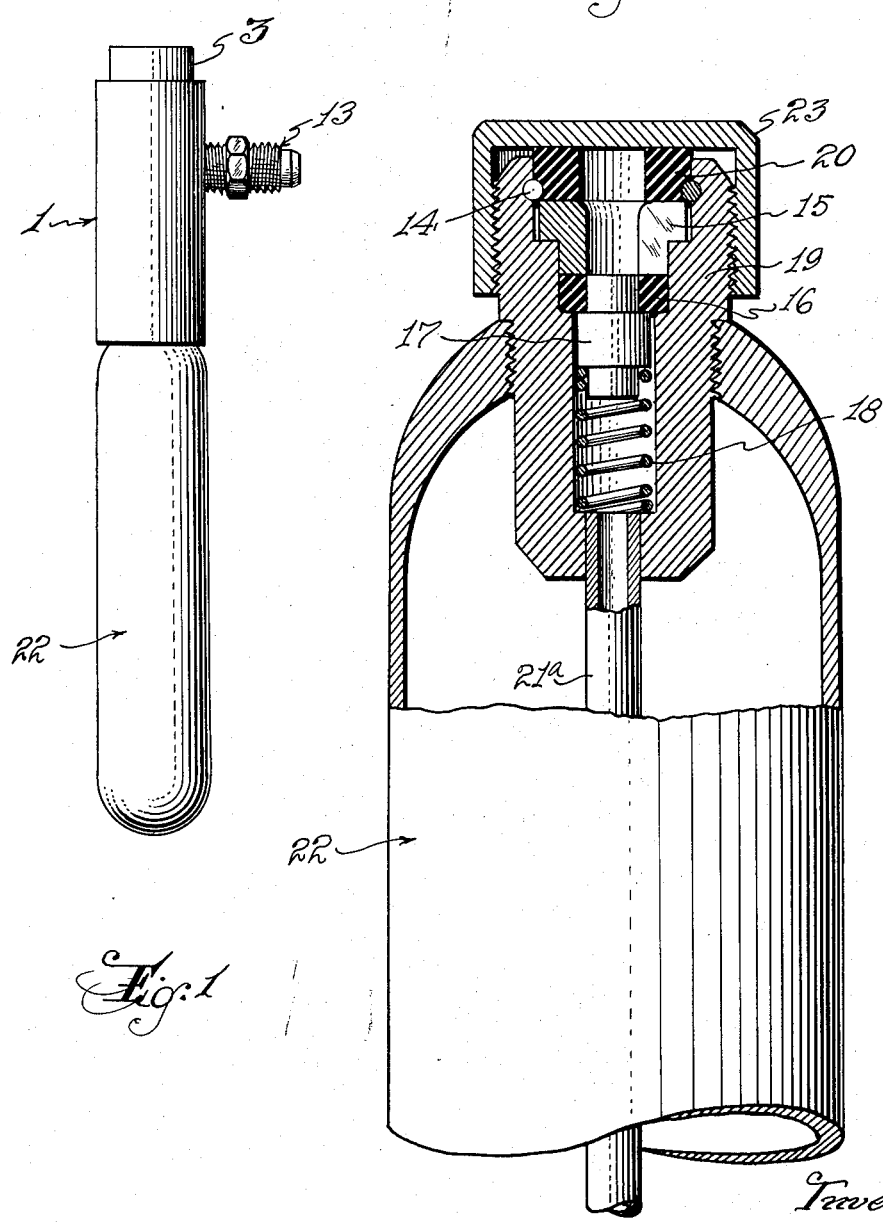
Inventor:
Thomas R. Pritchard
BY
Attorney.

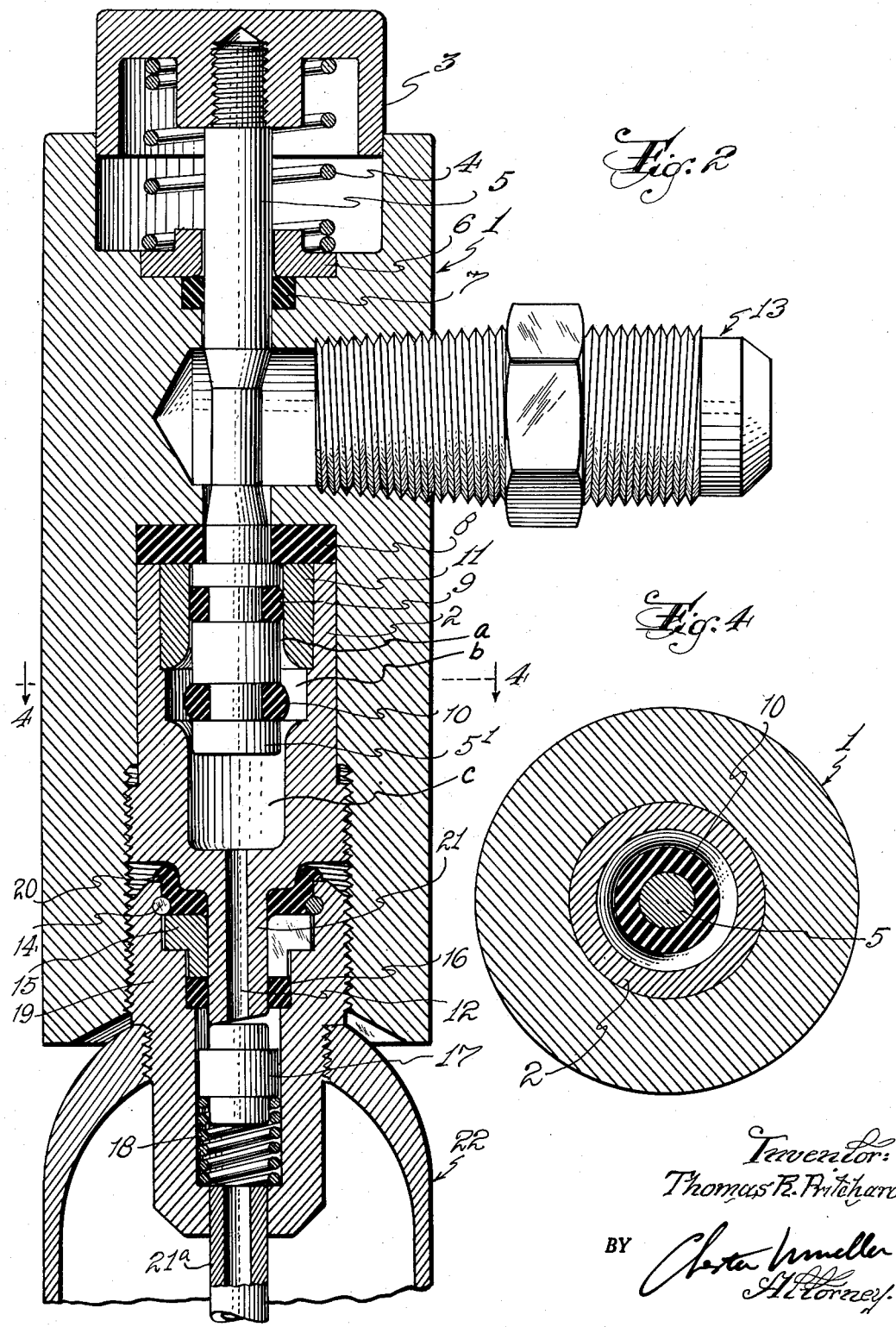

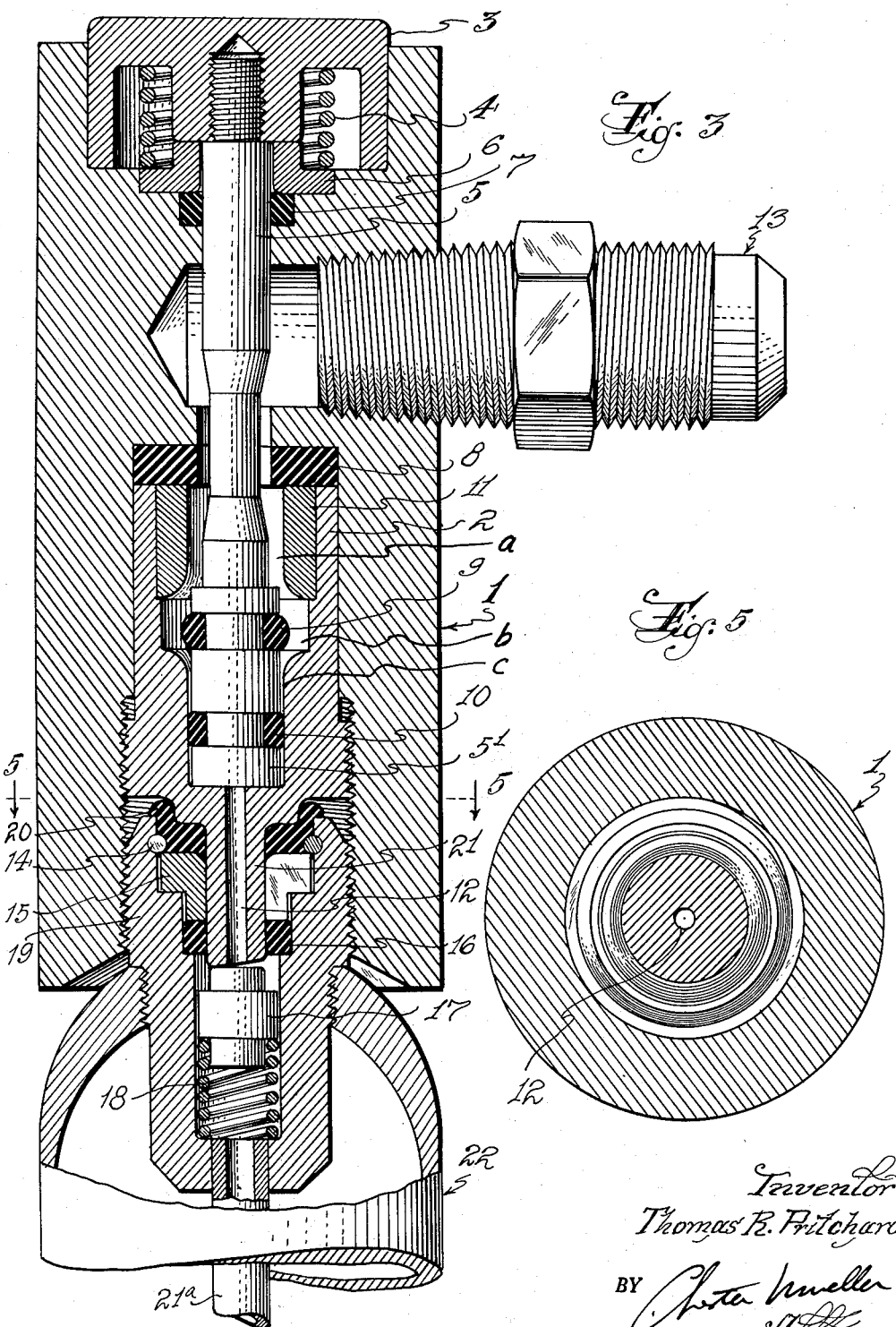

United States Patent Office 2,747,775
Patented May 29, 1956

2,747,775

MEASURING VALVE CLOSURE

Thomas R. Pritchard, Kearny, N. J., assignor to Tanra Manufacturing Co., Orange, N. J., a corporation of New Jersey Application April 29, 1953, Serial No. 351,996

4 Claims. (Cl. 222—400.7)

This invention relates to a measuring valve closure of the type generally associated with pressure vessels.

The object of this invention is to provide a valve closure for a pressure vessel which will permit the discharge of a measured amount of the contents of such a vessel at the will of the operator.

Another object is to provide sealing means within such a closure for preventing the escape of the contents of a pressure vessel except through the discharge port.

Still another object is to provide the combination of a valve unit and a pressure vessel having a displaceable closure, whereby a filled pressure vessel will be available for dispensing use immediately after the valve unit is secured thereto.

Furthermore this invention permits the economical fabrication of both pressure vessels and valve closures, and has other advantages which will be apparent in the description which follows.

This invention is illustrated in the accompanying drawings in which:

Figure 1 is a side view of a pressure vessel with a valve closure attached thereto.

Figure 2 is an enlarged side elevational sectional view of a valve closure in fully closed position.

Figure 3 is similar to Figure 2 except that the valve is shown at the instant of discharge of its measured contents.

Figure 4 is a cross section taken on line 4—4 of Figure 2.

Figure 5 is a cross section taken on line 5—5 of Figure 3.

Figure 6 is an enlarged side view, partially in section, of the upper part of a capped pressure vessel without the attached valve closure.

Referring to the drawings in which the same number refers to the same or a similar part, it will be observed in Figure 1 that valve body 1 has projecting from its top surface, finger piece 3, and projecting outward from its side, outlet fitting 13. Valve body 1 is attached to and over the top of pressure vessel 22.

Now turning to Figure 6, pressure vessel 22 is shown with a closure fitting 19 threaded into an opening in its top. Within closure fitting 19 there is a chamber in which valve 17 is yieldably seated against seal 16 by spring 18. Seal 16 is held in place by bushing 15, on top of which are firmly seated split ring 14 and washer 20. The bottom of the chamber in the closure fitting 19 opens into syphon tube 21a which, as is conventional in pressure vessels of this type, extends almost to the bottom of the pressure vessel. Shipping cap 23 is threaded to closure fitting 19 protecting its outer end.

Before assembling valve body 1 to pressure vessel 22, shipping cap 23 is removed from the latter and in its stead valve body 1, being suitably threaded, is screwed thereon.

Referring now to Figure 2, the details of construction of valve body 1 may be examined. Formed in its lower portion by washer 8 and bushings 2 and 11 is a chamber which at the bottom opens into passage 12 of tube 21. This tube unseats valve 17 when valve body 1 is assembled to the pressure vessel, its biased end permitting the contents of the vessel to pass up through passage 12.

The chamber in the lower portion of valve body 1 is shaped to form cylindrical portions a, b and c, the central portion b, being of greater diameter than a or c. Valve 5' and valve stem 5 are slideable within the limitations of this chamber and by means of spring 4, spring retainer 6 and finger piece 3 are normally in the position shown in Figure 2. Sealing washer 7 surrounds valve stem 5 to prevent leakage past the stem. Below sealing washer 7 outlet fitting 13 provides a discharge port for valve body 1.

When valve 5' is raised to its uppermost position, clear of the opening into passage 12, as shown in Figure 2 ring seal 9 surrounding valve stem 5 closes chamber portion a to passage of material but leaves b and c clear and interconnected. When valve 5' closes the opening to passage 12, sealing ring 10 closes chamber portion c while a and b are clear and interconnected. In the later condition the chamber is connected to the discharge port of valve body 1.

The operation of the valve closure is as follows:

After being assembled to the pressure vessel the parts will appear as in Figure 2 and some of the contents of the pressure vessel fill the chamber of valve body 1. Upon depressing finger piece 3 against the resistance of spring 4, ring seal 10 is moved downward sealing off further escape of the vessel contents, and, with the downward movement of ring seal 9 beyond the upper chamber limits, such contents as were in the chamber are permitted to escape through outlet fitting 13. Releasing finger piece 3 will permit the chamber to be again filled in preparation for release of another measured quantity of the contents of the pressure vessel.

It is obvious that many modifications may be made in the construction illustrated and described and it is not intended by the foregoing specifications to limit the scope of my invention.

What I claim is:

1. The combination of a pressure vessel and a dispensing valve closure, comprising a pressure vessel opening out through a neck; a closure seal slideable within such neck; a closure seal seat at the outer end of the neck; yieldable means urging the closure seal against the seat; a valve body having a recess at one end within which recess the said neck is disposed in hermetically sealing engagement; a chamber within the valve body; a tube disposed in said neck and being of such length as to unseat the said closure from its seat thereby providing communication between the interior of the pressure vessel and the chamber in the valve body; a passage connecting the chamber with the tube; an outlet port in the side of the valve body; a second passage connecting the chamber with the outlet port; a plunger slideable within the chamber in selective sealing engagement alternatively with the opening of each passage leading therefrom; and a finger piece external of the valve body operatively connected with the plunger.

2. The combination of a pressure vessel and a dispensing valve closure, comprising a pressure vessel opening out through a neck; a closure seal slideable within such neck; a closure seal seat at the outer end of the neck; yieldable means urging the closure seal against the seat; a valve body having a recess at one end within which recess the said neck is disposed in hermetically sealing engagement; a tube projecting from the valve body concentrically disposed within the recess and being of such length as to unseat the said closure from its seat thereby providing communication between the interior of the pressure vessel and the chamber in the valve body; a chamber within the valve body; a passage connecting the chamber with the inward opening of the tube; an outlet port in the side of the valve body; a second passage connecting the chamber with the outlet port; a plunger slideable within the chamber in selective sealing engagement alternatively with the opening of each passage leading therefrom; and a finger piece external of the valve body operatively connected with the plunger.

3. The combination of a pressure vessel and a dispensing valve closure, comprising a pressure vessel opening out through a neck; a closure seal slideable within such neck; a closure seal seat at the outer end of the neck; yieldable means urging the closure seal against the seat; a valve body having a recess at one end within which recess the said neck is disposed in hermetically sealing engagement; a tube concentrically disposed within the recess with its outer open end biased, and being of such length as to unseat the said closure seal from its seat thereby providing communication between the pressure vessel and the chamber in the valve body; a chamber within the valve body opening into the said tube at its inner end; an outlet port in the side of the valve body; a passage connecting the chamber with the outlet port; a plunger slideable within the chamber in selective sealing engagement alternatively with the opening of each passage leading therefrom; and a finger piece external of the valve body operatively connected with the plunger.

4. The combination of a pressure vessel and a dispensing valve closure, comprising a pressure vessel opening out through a neck; a closure seal slideable within such neck; a closure seal seat at the outer end of the neck; yieldable means urging the closure seal against the seat; a valve body having a recess at one end within which recess the said neck is disposed in hermetically sealing engagement; a tube projecting from the valve body into the recess with its outer open end biased, and being of such length as to unseat the said closure seal from its seat without closing the outer open end of the tube; a chamber within the valve body; a passage connecting the chamber with the inner open end of the tube; an outlet port in the side of the valve body; a second passage connecting the chamber with the outlet port; a plunger slideable within the chamber in selective sealing engagement alternatively with the opening of each passage leading therefrom; and a finger piece external of the valve body operatively connected with the plunger.

References Cited in the file of this patent

UNITED STATES PATENTS

| | | |
|---|---|---|
| 639,412 | Lejune | Dec. 19, 1899 |
| 1,372,565 | Skelly | Mar. 22, 1921 |
| 1,614,532 | Mobley | Jan. 18, 1927 |
| 1,812,798 | Linders | June 30, 1931 |
| 1,972,132 | Dodge et al. | Sept. 4, 1934 |
| 2,305,286 | Ward | Dec. 15, 1942 |
| 2,429,003 | Trapet | Oct. 14, 1947 |
| 2,502,452 | Grant, Jr., et al. | Apr. 4, 1950 |

FOREIGN PATENTS

| | | |
|---|---|---|
| 352,073 | France | May 22, 1905 |